United States Patent [19]
Link et al.

[11] Patent Number: 4,698,123
[45] Date of Patent: Oct. 6, 1987

[54] METHOD OF ASSEMBLY FOR OPTICAL FIBER DEVICES

[75] Inventors: Edward P. Link, Rochester; John P. Kerwawycz, Henrietta, both of N.Y.

[73] Assignee: Xerox Corporation, Stamford, Conn.

[21] Appl. No.: 929,687

[22] Filed: Nov. 12, 1986

[51] Int. Cl.[4] .......................... C23F 1/02; B44C 1/22; C03C 15/00; C03C 25/06

[52] U.S. Cl. .................................. 156/634; 156/645; 156/656; 156/659.1; 156/902; 156/273.1; 156/300

[58] Field of Search ............... 156/629, 634, 645, 656, 156/659.1, 902, 256, 273.1, 300; 346/1.1, 75, 140 R; 350/96.1, 96.11, 96.16, 96.2, 96.24; 250/227

[56] References Cited

U.S. PATENT DOCUMENTS 4,255,754 3/1981 Crean et al. .......................... 346/75
4,344,078 8/1982 Houston ............................... 346/75
4,410,895 10/1983 Houston et al. .................... 346/1.1

*Primary Examiner*—William A. Powell
*Attorney, Agent, or Firm*—Robert A. Chittum

[57] ABSTRACT

An optical fiber sensing device and fabrication method therefor, wherein a plurality of individual glass fibers included therein is automatically electrostatically aligned. In the preferred embodiment, a rigid, metal-clad insulative substrate is photolithographically patterned and etched to prepare precise metal lines and connecting bus for the accurate placement of the optical fibers. A 10 kv potential between the etched lines and the fibers will attract and align the fibers with the metal lines. While the optical fibers are held aligned with the metal lines, they are secured thereto by a fast drying adhesive and then the potential released. One edge of the substrate with the attached fibers is diced. The ends of the fibers formed by the dicing operation are used as light transmitters or receivers, while the opposite ends of these fibers are connected to respective light sources and photosensing circuits. A droplet sensor may be formed by mating the surfaces of two substrates containing the adhered fibers together, with the fibers of one substrate being adjacent the fibers of the other, but offset by one fiber diameter. A third substrate is arranged so that its fiber ends confront those on the mated substrates. The fibers of the third substrate are connected to a light source and the fibers of the two mated substrates are connected to a photosensing circuit.

5 Claims, 4 Drawing Figures

METHOD OF ASSEMBLY FOR OPTICAL FIBER DEVICES

BACKGROUND OF THE INVENTION

This invention relates generally to precision assembly of multiple optical fibers in optical devices, and more particularly, to fabrication of differential fiber optic sensors, such as, for example, those used for sensing the position of ink droplets during flight.

Ink jet printers of the continuous stream type employ printheads having multiple nozzles from which continuous streams of ink droplets are emitted and directed towards a recording medium. Printing information is transferred to the droplets of each stream by electrodes which charge the droplets passing thereby. This permits each droplet to be individually charged so that it may be positioned as a distinct location on the recording medium different from all other droplets or sent to the gutter. As the droplets proceed in flight from the charging electrodes towards the recording medium, they are passed through an electric field which deflects each individually charged droplet in accordance with its charge magnitude to specific pixel locations on the recording medium. Thus, to calibrate the ink jet printer, the ink droplet trajectories must be determined and adjusted. One such means of calibrating the ink droplets is described in U.S. Pat. No. 4,225,754 to Crean et al.

U.S. Pat. No. 4,255,754 to Crean et al discloses the use of paired photodetectors to sense ink droplets, one each for two output fibers that are used to generate an electrical zero crossing signal. The zero crossing signal is used to indicate alignment or misalignment of a droplet relative to the bisector of a distance between two output fibers. The sensor of this patent employs one input optical fiber and at least two output optical fibers. The free ends of the fibers are spaced a small distance from each other; the free end of the input fiber is on one side of the flight path of the droplets, and the free end of the output fibers are on the opposite side. The remote end of the input fiber is coupled to a light source, such as an infra-red light emitting diode. The remote ends of each output fiber are coupled to separate photodetectors such as, for example, a photodiode responsive to infra-red radiation. The ink is substantially a dye dissolved in water and is, of course, transparent to infra-red light, thus reducing the problems of contamination usually associated with ink droplet sensors. The photodiodes are coupled to differential amplifiers, so that the output of the amplifiers are measurements of location of the droplets relative to the bisector of the distance between the two output fiber ends confronting the associated input fibers and droplets passing therebetween. Amplifier outputs are used in servo loops to position subsequently generated droplets to the bisector location. This process enables droplets from each stream to be precisely positioned to multiple pixel positions within a segment of a print line that extends across the recording medium. Consequently, the print line segments of the adjacent droplet streams are said to be stitched.

The Crean et al optical fiber sensors involve a large number of fibers with each of the two output fibers being separated into groups for termination at first and second photodetectors. If the two output fibers for each sensor are identified as A and B fibers, all of the A fibers share the same photodetector, and all of the B fibers share the same second photodetector. Since the light collecting ends of the plural sets of A and B fibers lie in the same plane, the A fibers must cross over the B fibers for the two types to be grouped together. That is, the fibers are organized into groups that intersect each other thereby necessitating that the A fibers be crossed over the B fibers or vice versa. This can be done with individual fibers but makes for difficult assembly of a large number of sensors.

U.S. Pat. No. 4,344,078 to Robert D. Houston, discloses the offsetting of the light collecting ends of each A and B fiber into parallel and separate planes, at least at the sensing zone. In one embodiment, the A fibers of multiple fiber pairs are formed on a support surface of a single substrate member. The A fibers are coated over with an appropriate separation material creating a second laminated support surface. The B fibers are formed on this second support surface. In another embodiment, the A, B, and input fibers are formed on separate substrates. The A and B fibers are then oriented at the sensing zone. Detection circuits coupled to the remote ends of the A and B fibers store the signals associated with a droplet shadow striking the A and b fibers. The storage is provided because the two signals are generated at different times. The delay is due to the separation between the A and B fibers along the direction of droplet flight. Thus, the patent to Houston discloses one method for practicing the sensing technique disclosed in the Crean et al patent. Further, the light source and receiver of Houston sensor include optical paths which are photofabricated to a support substrate.

U.S. Pat. No. 4,410,895 to Robert D. Houston et al, discloses the use of an optical masking technique which allows utilization of bulk optical fibers having cross-sectional areas greater than the dimension required by the ink droplet sensing apparatus. These bulk fibers can be more easily routed away from the sensing sights and can be manually flexed and bent as needed to route them to the light intensity detecting circuitry. Masks are interposed between the input and output light fibers to define optical sending and receiving sights having areas less than the fiber areas which they mask. The masking of these fibers is accomplished by positioning electroformed metal masks over the end surface of these output fibers. The light transmitting regions as defined by these masks are separated along the dimension of the path travel all being closely spaced in the direction of droplet deflection. The closely adjacent positioning of the output fibers enhances sensitivity to aid in the stitching together of the ink droplets and a printing array. According to one assembly technique, the input and output fibers are manually mounted to a mounting plate through which mounting holes are drilled. The optical fibers are inserted through the plate and then secured in place by a plotting compound which firmly secures the fibers to the plate without limiting bending or flexing of the optical fibers.

Fiber optical devices requiring a plurality of precisionally aligned optical fibers, such as, for example, aligned sending and receiving fibers which respectively interface with a light source and light responsive electronic components are generally manually assembled. Current methods of achieving appropriate alignment require dexterous individuals to position tediously the optical fibers into fabricated channels or grooves one fiber at a time through the use of a microscope. As each fiber is placed in a channel, they are adhesively secured. Such manual assembly is not only slow and costly, but are subject to damage by the person fabricating the optical fiber array. One broken or misaligned optical fiber reduces the effectiveness of the array, especially if used as a drop sensor in an ink jet printer.

Therefore, a need remains for the development of an automated technique for the precision aassembly of a plurality of aligned optical fibers which provide minimum labor costs with substantially zero human error, while maintaining the highest quality and productivity.

SUMMARY OF THE INVENTION

It is an object of the present invention to provide an automated assembly of a plurality of precisely aligned optical fibers used for sending and receiving light.

In the present invention, the automated precision assembly of a plurality of optical fibers for an optical device such as, for example, an optical sensor for ink droplets, is accomplished by the use of a rigid metal clad substrate on which precise conductive lines are etched or photolithographically produced. The precisionally produced lines may be one mil or 25 micrometers and will attract and align an optical glass fiber therewith having a diameter as large as three mils or 75 micrometers, if it is placed within approximately 0.2 inch or about half-centimeter from the conductive lines and a 10 kv potential is produced between the fiber and the lines. While the fiber is electrostatically secured to the lines, and thus the substrate, a fast-drying adhesive can be applied and the charge or potential released. Many fibers may be placed and secured concurrently using this technique.

A more complete understanding of the present invention can be obtained by considering the following detailed description in conjunction with the accompanying drawings.

DESCRIPTION OF THE PREFERRED EMBODIMENT

Figure 1:
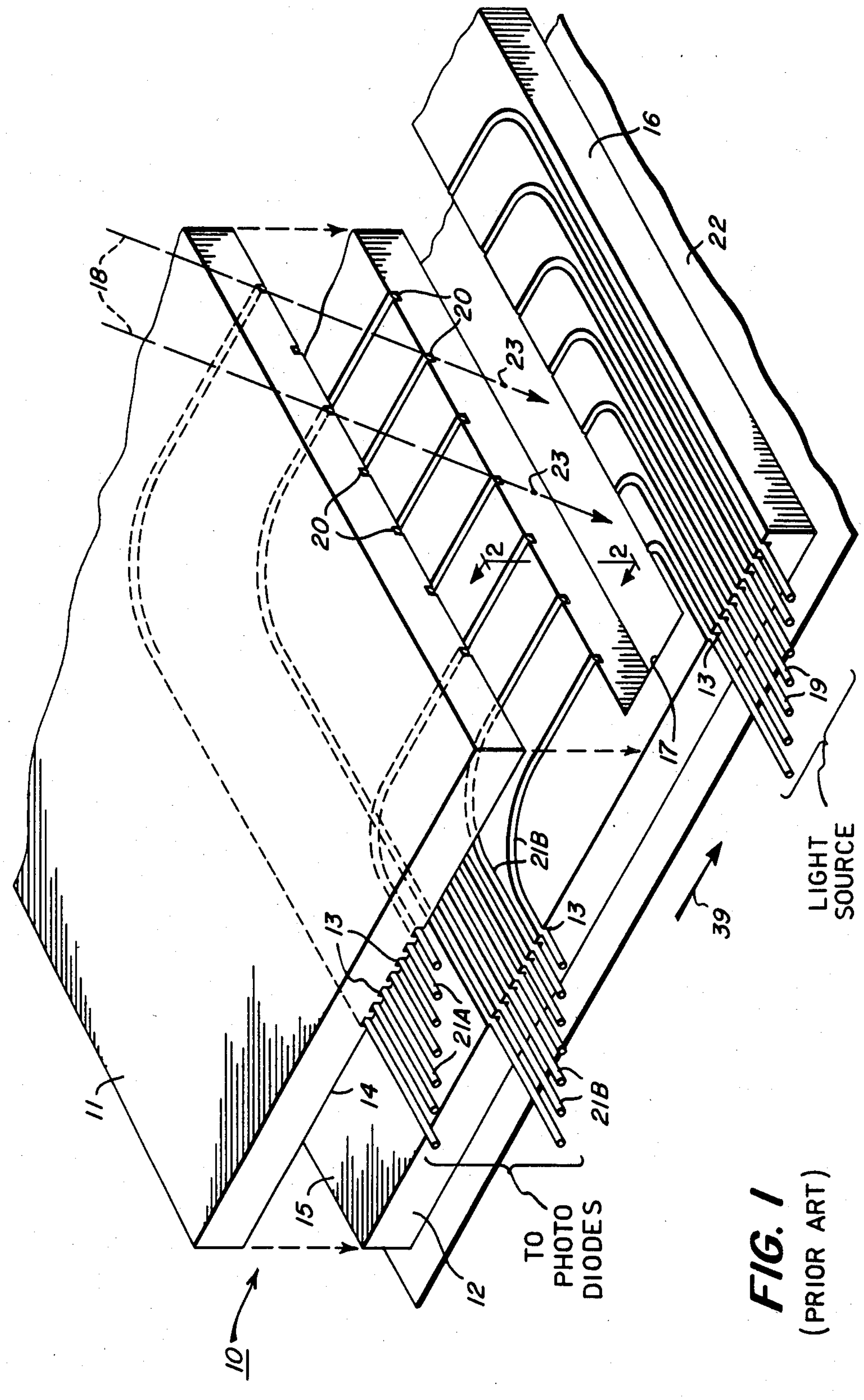
FIG. 1 (PRIOR ART)
FIG. 1 is a partially exploded, isometric view of a typical prior art fiber optic sensor for ink droplet detection in which the optical fibers have been manually placed and glued individually into grooves.
Figure 2:
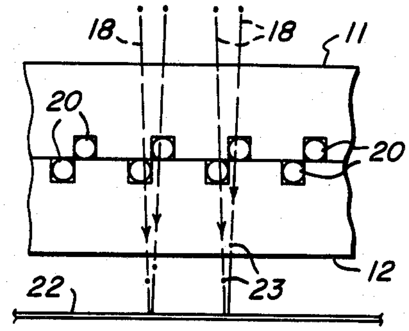
FIG. 2 (PRIOR ART)
FIG. 2 is an enlarged view taken along view line 2—2 of FIG. 1.

In FIG. 1, a partially exploded view of a fixedly positioned ink droplet sensor 10 similar to the type described in the Crean et al patent is shown. Top substrate 11 and main support board 12 have small grooves 13 formed in the confronting surfaces 14, 15 of the substrate and board, respectively, in which optical fibers 21A and 21B are manually placed one at a time and fixed in the grooves by an adhesive. An elongated aperture 17 is formed in support board 12 to accommodate the passage of ink droplets 23, the trajectories of which are indicated by dashed lines 18. Optical fibers 19 are placed in the grooves 13 in portion 16 of support board 12. One end of these optical fibers 19 are connected to a light source (not shown), the other end terminates at one edge of the aperture 17, so that the light transmitted therefrom are received by the optical fibers 21A, 21B having input ends 20 terminating on the opposite side of aperture 17. The input ends of the optical fibers 21A, 21B, which receive the light, are shown in FIG. 2, where FIG. 2 is an enlarged view of the receiving fiber ends 20, as viewed along view line 2—2 of FIG. 1. The other ends of the receiving fibers 21A, 21B are connected to photodiodes in a typical sensing circuit (not shown). Thus, the support board 12 having aperture 17 permits the droplets emitted by the printhead nozzles (not shown) to be passed therethrough towards a moving recording medium 22 spaced a predetermined distance therefrom. The charged droplets 23 are deflected by an electric field into trajectories 18 prior to their passage between the input ends of receiver fibers 21A, 21B. Thus, the input ends of the receiver fibers are located so that each pair is shared by adjacent nozzles. Each of the plurality of nozzles is responsible for placing droplets at some finite number of lineal pixel positions on the recording medium as it moves past aperture 17 in the direction of arrow 39. The deflection field sweeps the droplets from each nozzle along a nominal deflection plane to print a single line of pixels across the width of the recording medium. Each nozzle is responsible for a segment of the pagewidth line. When the droplets from adjacent nozzles are, in fact, aligned to adjacent pixel positions on the recording medium, the droplets from the nozzles are said to be stitched together. By stitching, it is meant accurate placement of adjacent endmost droplets from two separate, but adjacent nozzles on the recording medium. The printed pixels are stitched if they are substantially without gap or overlap.

The prior art sensor in FIGS. 1 and 2 require the very accurate placement of optical fibers on the substrate 11 and support board 12. This is best accomplished by forming very small grooves 13 on respective confronting surfaces 14, 15 of the substrate and support board, and then manually positioning an optical fiber 19, 21A or 21B into the grooves one at a time. Once the fiber is in a groove, it is then bonded therein by a fast curing adhesive manually applied. Such a fabrication process is slow, costly, and subject to human error and damage, so that the yield for a sensor having 100 percent sensing sites is low.

Figure 3:
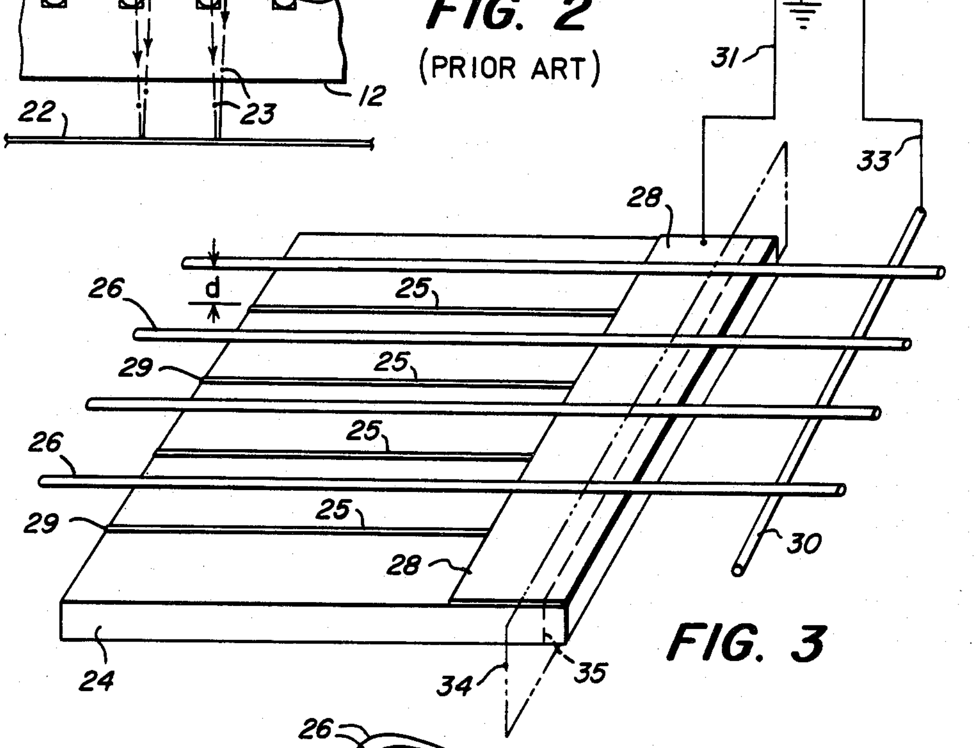
FIG. 3 is a schematic representation of the present invention showing a partially metal clad substrate with a plurality of precision metal lines depending from the metal cladding and a fiber placed about 0.5 centimeters from each of the lines with 10 kv from a power supply connected therebetween.

In FIG. 3, the method and apparatus for automatic assembly of the optical fibers on an insulative or dielectric substrate employing electrostatic principles is shown. Though only four fibers are depicted for ease of explanation, it should be understood that many fibers are similarly aligned and bonded concurrently in groups of between 10 and 50, until the required quantity is assembled. Such a sensor design includes a rigid metal clad insulative substrate material 24 on which precise lines 25 correlating to the desired position of the optical fibers 26 are formed, such as, by an electrochemically etching process. THe accuracy of the fiber placement is controlled by the degree of precision achievable in the photolithographic/chemical steps to produce the prepared substrate. Lines 25 as narrow as 1 mil or 25 micrometers are readily achievable. Optical fibers having a 25 to 75 micrometer diameter are placed a distance "d" or approximately 0.2 inches or about 0.5 centimeters from each etched line. When a potential of 10 kv from power supply 27 is applied to the etched lines 25 via the bus 28 and conductive contact rod 30, the optical fibers will be attracted to the etched lines and will axially align themselves thereon. The lines 25 and bus 28 are conveniently formed by etching the metal cladding of the substrate material, though other well known means of fabrication could be used. While the fibers are electrostatically secured to the rigid substrate material 24, a fast drying adhesive can be applied and the charge released. Thus, a plurality of fibers may be manually placed on the substrate material within the preferred distance "d" of the lines 25 and secured with this technique as shown in FIG. 3.

The basic attraction phenomenon which has been demonstrated is the result of electrostatic interaction between the optical fiber and the conducting line. It is the polarization of the dielectric glass fiber which results in the attractive force. Similar to the polarization that a dielectric material exhibits when placed between charged plates in an air gap capacitor, the high voltage power supply induces polarization in the bulk glass material. This results in the effective appearance of surface charge on the fiber. It is the attraction of the charge within the glass fiber to the etched line which positions the fiber along the lines.

In the preferred embodiment as insulative structure 24 is provided with a metal cladding between 1 and 3 mils or 25 and 75 micrometers thick which is photolithographically patterned and etched to form a bus 28 with depending lines 25 having a width of between 1 and 3 mils or 25 and 75 micrometers. One end of the lines 25 connect to the bus 28 and the distal ends 29 terminate at or near edge of the support structure opposite the one with the bus. Several optical fibers having diameters of 1 to 3 mils or 25 and 75 micrometers are placed on the support structure 24 either manually or by robot, so that they are within distance "d" in FIG. 3 of ±0.2 inches from each line along its length. In the preferred embodiment, approximately 20 optical fibers are manually placed at a time. Lead 31 connects the bus to the ground terminal 32 of the 10 kv power supply 27. Conductive contact rod 30 is then placed manually or by machine into contact with each of the plurality of fibers 26 and a positive or negative voltage is applied from the 10 kv source 27 to the fibers 26 via the conductive contact rod 30 and lead 33.

The fibers 26 are automatically aligned with the etched lines 25 and are then attached to the substrate 24 by an adhesive applied manually or by machine. An adjacent like quantity of 20 fibers are likewise attached by the above method until each etched line 25 on the substrate 24 has a fiber 26 attached to it. Optionally, a thermosetting plastic or the like may be formed over the fibers to place them within a protective layer (not shown), having a thickness that is approximately equal to the fiber diameters. The support structure and fibers are diced along dashed plane 34, so that one end of the fibers have end faces lying coplanar with the support structure edge 35, shown in dashed line, produced by the dicing operation.

Figure 4:
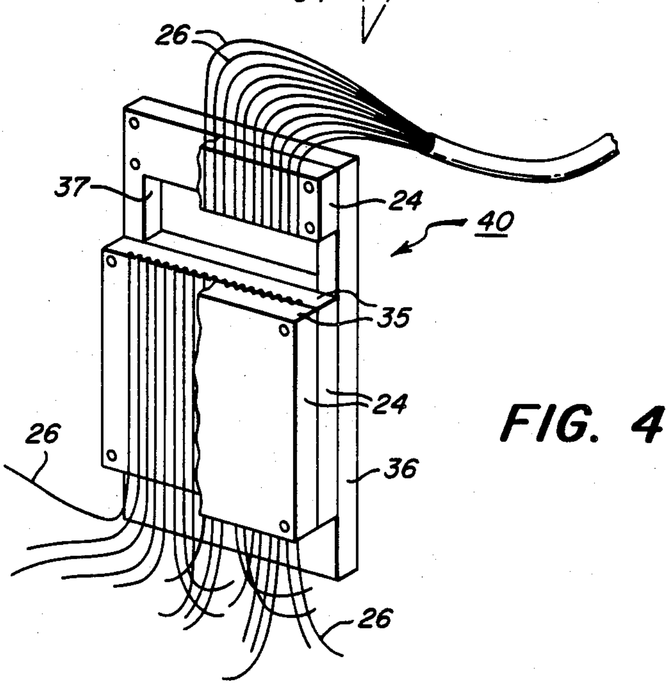
FIG. 4 is a partial, schematic isometric view of several of the parts shown in FIG. 3 assembled as an ink droplet sensor.

Referring to FIG. 4, three identical support structures 24 are assembled to form an ink droplet sensor 40 similar to that of Crean et al or the prior art sensor shown in FIG. 1. This is accomplished by mating the surfaces of two identical support structures 24 with adhered optical fibers and mounting them on a plate 36 having an elongated aperture 37 therein. The edges of the substrate material or support structure 24 are adjacent one edge of the aperture 37. When the surfaces of the support structures are mated, the fibers 26 are aligned and parallel to each other and are concurrently offset by the distance of one fiber diameter, so that the two mated support structures may be mounted on the plate 36 with the ends of the fibers 26 within the plate aperture 37. Looking in a direction normal to the fiber ends, the ends of the fibers will appear similar to that shown in FIG. 2.

A third identical support structure 24 with adhered fibers 26 is then mounted above the mated pair on the plate, so that the diced ends of the fibers in this third support structure are parallel with and confront those of the fiber ends on the mated pair of support structures. The fibers ends on the third or single support structure are aligned and spaced from each pair of confronting optical fiber ends. The optical fibers extending from the support structures may optionally be bundled together or encased with, for example, a curable liquid plastic material to reduce fiber breakage. Each fiber of the single support structure is connected to a light source and the mated pairs are connected to photodiodes in a typical ink droplet sensor circuit as discussed above.

Thus, the assembly technique depicted in FIG. 3 allows for the automatic assembly of an optical device by using electrostatic principles which result in minimal labor costs and which eliminate human error, along with providing the highest posible quality and productivity. Such a device has been far superior to that manually assembled as discussed above with respect to FIG. 1.

Other objects and features of this invention will be apparent to those skilled in the art from a reading of the specification and from the drawings. Such modifications are intended to be included within the scope of the present invention.

We claim:

1. A method for producing an optical fiber sensing device comprising the steps of:

(a) forming a metal cladding on one surface of a dielectric substrate;

(b) photolithographically patterning and etching the metal cladding on the substrate to form a bus and a plurality of spaced, parallel conductive lines extending from the bus;

(c) placing a plurality of glass optical fibers on the substrate surface having the bus and lines, so that each fiber is within a predetermined distance of one of the lines;

(d) applying an electric potential between the fibers and the lines, the potential having sufficient magnitude to attract and hold the fibers to the lines;

(e) adhering the fibers to the substrate and their respective lines with an adhesive while the fibers are being electrostatically held by and in alignment with the lines; and (f) removing the potential, after the adhesive has at least partially cured.

2. The method of claim 1, wherein the adhered fibers are covered with a layer of thermosetting resin to provide an encapsulating protective layer for the fibers.

3. The method of claim 1, wherein the method further comprises the step of:

(g) dicing one end of the substrate in a direction perpendicular to the fibers to make the diced ends of the fibers coplanar with the diced edge of the substrate.

4. The method of claim 3, wherein the method further comprises the steps of:

(h) mating the surfaces of two identical substrates with the fibers, so that the diced ends of the fibers are coplanar and offset from each other by the distance of one fiber diameter;

(i) mounting the mated pair of substrates with the fibers on a support board having an elongated aperture therein, the diced ends of the fibers being aligned in the aperture with the plane of the fiber ends being perpendicular to the plane of the aperture;

(j) mounting a third identical substrate with the fibers on the support board, so that the diced ends of the fibers confront and are parallel the diced ends of the fibers in the mated pair of substrates, the fiber ends of said third substrate being aligned within the support board aperture and with a respective offset pair of confronting fiber ends for the passage of ink droplets between said confronting fiber ends and through the aperture;

(k) connecting the ends of the fibers of the third substrate opposite the ones adjacent the aperture to a light source;

(l) connecting the ends of the fibers of each of the mated substrates opposite the ones adjacent the aperture to respective photosensing circuits for the differential sensing of the passing droplets.

5. The method of claim 4, wherein the fibers between the substrates and the light source and photosensing circuits are encased in a protective material to prevent mechanical damage thereto.

* * * * *